United States Patent [19]

Tuschhoff et al.

[11] 4,256,509

[45] Mar. 17, 1981

[54] PHYSICAL MODIFICATION OF THE VISCOSITY CHARACTERISTICS OF STARCHY FLOURS

[75] Inventors: John V. Tuschhoff; James E. Eastman; Schanefelt Robert V., all of Decatur, Ill.

[73] Assignee: A. E. Staley Manufacturing Company, Decatur, Ill.

[21] Appl. No.: 38,619

[22] Filed: May 14, 1979

[51] Int. Cl.$^3$ ............................................. C13L 1/08
[52] U.S. Cl. ...................................... 127/32; 127/71
[58] Field of Search ................ 127/32, 71; 426/425, 426/424, 431, 658

[56] References Cited

U.S. PATENT DOCUMENTS

| | | | |
|---|---|---|---|
| 3,123,502 | 3/1964 | Henry et al. | 127/71 |
| 3,479,220 | 11/1969 | Ferraro | 127/32 X |
| 3,586,536 | 6/1971 | Germino et al. | 127/71 X |
| 3,617,383 | 11/1971 | Thurston et al. | 127/32 X |
| 4,158,574 | 6/1979 | Cummisford et al. | 127/32 |

*Primary Examiner*—Michael S. Marcus

*Attorney, Agent, or Firm*—M. Paul Hendrickson; Charles J. Meyerson

[57] ABSTRACT

A method of modifying the viscosity characteristics of a starchy flour by physical treatment, including heating in alcohol in a confined zone. The resulting starchy flour exhibits thin-thick viscosity characteristics when heated, and provides added viscosity in acid systems without breaking down. It has particular application to baby food recipes to impart desired texture and mouthfeel. Oat flour is the presently preferred starchy flour to be treated for use in baby foods.

In one embodiment, a starchy flour is slurried in an aqueous organic liquid, preferably ethanol, and is then subjected to heat and pressure for a predetermined time to modify the physical properties of the flour. The specific combination of pressure, temperature, and heating time determine the properties of the treated flour. The alcohol treatment of the starchy flour may be performed continuously by forcing the starchy slurried in alcohol through a tubular confined zone under the required conditions of heat, pressure and residence time in the reactor to accomplish the desired physical changes. The continuous process greatly improves production rates.

13 Claims, No Drawings

PHYSICAL MODIFICATION OF THE VISCOSITY CHARACTERISTICS OF STARCHY FLOURS

BACKGROUND OF THE INVENTION

A number of different physical treatments of starch have been proposed in the past, but, to our knowledge, physical modification by the methods used on starch have not been proposed for physical modification of starchy flours. One of the earliest physical treatments used on starch is dextrinization by heat, generally believed to have had its origins from observing the effect of the intense heat of a fire on starch stored in a warehouse ("British Gums"). "Brewer's grits" can be made from starch by a combination of heat and pressure applied to a thick starch slurry, usually by means of a drum dryer. The starch becomes gelatinized, and forms a film on the rotating dryer drum. The starch film is dried and then broken into small chunks to make a dustless grit product. Such "grits" are convenient to use in breweries as a carbohydrate source for fermentation.

One difficulty with heat treating a starchy flour in an aqueous slurry is that the starch component gelatinizes, and loses its discrete granular form. The gelatinized starch cannot be filtered, and excess water is difficult to remove without further changing the properties of the starchy flour. It is therefore desirable to preserve the granular structure of the starch component to the extent possible by using other liquids, such as lower alcohol, in which the starch component of the flour retains its granular structure, or at least some semblance of a granule form which is filterable, thereby making it possible to separate the physically modified starchy flour from the process liquid.

Various patents describe treating starch in alcohol, but none were found which describe such treatment of a starchy flour. Typical of such patents showing starch treatment is U.S. Pat. No. 2,587,650 issued Mar. 4, 1952 to Carl E. Rist et al. This patent describes the use of a lower alkanol (methanol, 85 volume percent), heat (105°–125° C.), and pressure (1 and 6 atmospheres or more) to physically treat starch. This reference points out that the process is "readily adaptable to continuous operation and/or to recycling and reuse of the extracting solvent" (Column 3, lines 45–46). There is no mention of similarly treating starchy flours, however.

A somewhat later series of patents includes U.S. Pat. No. 3,586,536 issued June 22, 1971. This patent describes heating starch slurried in methanol in a confined zone to a temperature in the range of 225° F. to about 300° F. for a time "not in excess of thirty minutes." There is no description of such treatment of starchy flours, though. This patent states that "ethanol, isopropanol and acetone are considered to be inoperable in our invention." See: U.S. Pat. No. 3,586,536, Column 7, lines 2–4. These latter organic liquids were said to result in either insufficient reduction of the fat content of the starch, or incipient gelatinization of the starch.

U.S. Pat. No. 3,617,383 issued Nov. 2, 1971 to Thurston et al., describes in great detail the effect on starch caused by the solvent treatment of starch in a confined zone. The process temperatures in the examples range from 230°–320° F. Starchy flours are not disclosed as a substance which may be subjected to the method described in this patent, however.

SUMMARY OF THE INVENTION

This invention is directed to an improved process for physically modifying a starchy flour. The starchy flour may be slurried in an aqueous, lower alkanol liquid under conditions of elevated temperature and pressure, and treated for a time sufficient to change its viscosity characteristics. More particularly, in the preferred method of the invention, a starchy flour is slurried in aqueous ethanol and forced through a continuous tubular reactor under pressures up to about 200 psig., and at temperatures up to about 340° F. The alcohol concentration is preferably about 80–95% ethanol, and 5–20% water, and indirect heating is provided to the continuous tubular reactor to maintain the temperature therein at about 140°–170° C. (284°–338° F.). The residence time of the starchy flour slurry in the continuous tubular reactor is about 1–30 minutes.

As the starchy flour is forced through the continuous tubular reactor under pressure and heat, its viscosity characteristics are changed. The treated starchy flour has definite stabilized viscosity characteristics, which makes it well-suited for use in baby foods, and in other uses in which a stable thickening effect is required. Although the exact nature of the change in the starchy flour which causes the change in its viscosity behavior is not known, it is considered possible that it may be due to crosslinking of protein molecules caused by the combined effects of the treatment.

EXAMPLE I

An oat flour was heat treated according to the method of the subject invention. The oat flour contained starch, and had the following analysis.

| | |
|---|---|
| Moisture | 9.3% by weight |
| Ash | 2.31% by weight |
| Protein/Fiber | 29.1% by weight |
| Protein | 17.96% by weight (as is basis) |
| Fat | 7.05% by weight (as is basis) |
| Starch | 55–70% by weight (dry solids basis) |
| Other Components | Balance |

It is expected that each of the above analysis may vary, in some instances by as much as plus or minus six percent, depending on the variety of oat flour. Prior to treatment, the above oat flour gave the following Brabender values: (a sample containing 6% oat flour in water pH 6.5 buffer and salt was used).

| Pasting Temperature | Peak Viscosity | Initial at 95° C. | After 30 minutes at 95° C. | After 10 minutes at 50° C. |
|---|---|---|---|---|
| 60.5° C. | 245 | 170 | 140 | 355 |

A 2000 g. sample of the above oat flour was slurried in 4000 g. of denatured ethanol (35A) and was heated in a confined zone under pressure to 150° C. (302° F.) for five minutes and then cooled rapidly to room temperature (about 70°–80° F., or 21.1°–26.7° C.). The resulting treated oat flour was then filtered and dried. The product was then checked for Brabender viscosity with the following results: (a 6% by weight sample in pH 6.5 buffer with salt was used).

| Initial Viscosity at 95° C. | After 30 minutes at 95° C. | After 10 minutes at 50° C. |
|---|---|---|
| 120 | 185 | 340 |

As compared to the oat flour before heat treatment, the above treated oat flour showed significant thin-thick viscosity behavior. The initial viscosity was the lowest and the viscosity continued to increase throughout the test. The Brabender test was repeated on the above treated oat flour with the following results: (6% by weight sample in pH 6.5 buffer with salt).

| Initial Viscosity at 95° C. | After 30 minutes at 95° C. | After 10 minutes at 50° C. |
|---|---|---|
| 200 | 210 | 360 |

The above repeated viscosity test also indicated that the physically treated oat flour has definite thin-thick viscosity behavior when heated.

EXAMPLE II

The treated oat flour of Example I was then tested in blueberry baby food puree having the following formula:

| Component A | | |
|---|---|---|
| Ingredient | percent by weight | g. |
| water | 17.0 | 255 |
| salt | 0.12 | 1.8 |
| sugar | 9.4 | 141 |
| blueberries | 17.9 | 268.5 |
| pH is then adjusted to 3.25 with citric acid (about 3.8 g.) | | |
| Component B | | |
| water | 8.8 | 132 |
| oat flour | 3.8 | 57 |
| Component C | | |
| blueberries | 34.18 | 512.7 |
| sugar | 8.8 | 132.0 |

Procedure:
1. Fruit and water part of Component A is first liquefied by means of a blender, then salt and sugar are added.
2. Component B is then slurried (water and oat flour).
3. Component is then liquefied in a blender (Osterizer).
4. Component A is placed in a steam jacketed kettle, and is brought to a rolling boil.
5. Component B is then added and cooked for 90 seconds 205° F. for two minutes).
6. The steam is shut-off, and Component C is stirred in with a wire whip
7. The resulting blend of A, B, & C is then heated to 180° F. and placed in cans which are then sealed. Means is provided to measure the internal temperature of the food mass in the can
8. Run Bostwick at about 160° F. before retorting.
9. Retort in continuous oil bath at 240° F. up to 265° F., internal can temperature.
10. Take Bostwick and Brookfield viscosity of retorted material.

The above formula was identified as Sample A (3.8% by weight oat flour) in tests. A second formula was also made up, using all the same proportions as set forth above, except that 3.0% by weight treated oat flour was used. The latter formula was identified as Sample B in subsequent tests. Results of Bostwick viscosity tests for Samples A and B are set forth below:

| Oat Flour % by Weight | Bostwick | | | | Retorted Bostwick | | | | Time To Reach Internal Can Temp. | Retorted Brookfield Visc. |
|---|---|---|---|---|---|---|---|---|---|---|
| | 5" | 10" | 15" | 30" | 5" | 10" | 15" | 30" | | |
| A 3.8 | 9.2 | 7.8 | 10.2 | 10.7 | 4.5 | 5.0 | 5.5 | 6.0 | 4 minutes | 11,400 |
| B 3.0 | 11.0 | 11.7 | 12.2 | 12.7 | 5.6 | 6.4 | 6.7 | 7.3 | 3 minutes | 6,600 |

The sample B containing 3.0% by weight treated oat flour was the best all-around product in the above tests. Because the above Sample B rated so well in the above tests, it was subjected to further tests in the same blueberry-containing baby food formula. At 4 pH buffer, the Brookfield viscosity readings were as set forth below:

| Hot | Before Retort | After Retort | Time to $F_o$ 12 minutes |
|---|---|---|---|
| 75 | 1450 | 400 | 12.5 |
| At 6.5 pH buffer, the Brookfield viscosity readings were as follows: | | | |
| 325 | 1500 | 2250 | 35.0 |

The above baby food (Sample B) was also evaluated for texture, color, flavor, and viscosity, and was rated excellent.

Example III

Corn flour was also subjected to the same physical treatment in alcohol as described above. The corn flour used had the following general analysis:

| Moisture | 10.6% by weight |
|---|---|
| Ash | 1.07% by weight |
| Protein/Fiber | 14.8% by weight |
| Protein | 6.90% by weight (as is basis) |
| Fat | 3.78% by weight (as is basis) |
| Starch | 60–80% by weight (dry solids basis) |
| Other Components | Balance |

The above analysis may vary, in some instances by as much as plus or minus ten percent, depending on the variety of corn and milling process used. The Brabender test results for the subject corn flour were as follows:

| Pasting Temp. (°C.) | Peak Viscosity | Initial Viscosity at 95° C. | After 30 min. at 95° C. | After 10 min. at 50° C. |
|---|---|---|---|---|
| 75.5 | 300 | 210 | 260 | 420 |

The above corn flour was heated in denatured ethanol (35A) following the process generally described in Example I for oat flour to produce a heat-inhibited, cook-up starchy flour with the results set forth below. Two samples were prepared using the reaction conditions set forth:

Brabender Results (pH 6.5 buffer, 6% starch)

| Reaction Conditions | | | Brabender Results (B.U.) | | |
|---|---|---|---|---|---|
| time(min) | temp.(°C.) | Base Starch | Initial | 30 min./ 95° C. | 10 min./ 50° C. |
| 20 | 162–163 | Corn Flour* | 45 | 80 | 120 |
| 15 | 143–144 | Corn Flour | 165 | 160 | 210 |

EXAMPLE IV

Barley flour was subjected to physical treatment as set forth below. The barley flour used has the following analysis:

| | |
|---|---|
| Moisture | 10.80% by weight |
| Ash | 3.10% by weight |
| Protein/Fiber | 19.96% by weight |
| Protein | 12.21% by weight (as is basis) |
| Fat | 2.42% by weight (as is basis) |
| Starch | 55–70% by weight (dry solids basis) |
| Other Components | Balance |

The above analysis may vary, in some instances by as much as plus or minus ten percent, depending on the variety of barley and the milling process used.

Brabender Results (6% in pH 6.5 buffer with salt)

| Pasting Temperature | Peak Viscosity | Initial Visc. at 95° C. | After 30 min. at 95° C. | After 10 min. at 50° C. |
|---|---|---|---|---|
| 60.5° C. (@141° F.) | 205 | 190 | 170 | 320 |

The above barley flour (2200 g; or 1955.8 g. dry solids basis) was slurried in 4000 g. of denatured ethanol (35A), and was heated to 165° C. (329° F.) for about 1–60 minutes. The treated barley flour was then cooled to room temperature qabout 70°–80° F.). The flour was then filtered and washed with additional denatured alcohol (35A), and then dried. The treated barley flour had the following viscosity characteristics:

Brabender Results (6% in pH 6.5 buffer and salt)

| Initial Viscosity at 95° C. | Viscosity after 30 minutes at 95° C. | Viscosity after 10 minutes at 50° C. |
|---|---|---|
| 70 | 90 | 215 |

EXAMPLE V

Barley flour was treated in two ways for comparison in this example. A first Sample A was treated as follows: A slurry of 2000 g. (1778 g. dry solids basis) of barley flour in 4000 g. of denatured alcohol (35A) was heated to 150° C. (302° F.) for five minutes, and then cooled to room temperature (70°–80° F.). The treated barley flour was filtered and dried. Some of the untreated barley flour (designated Sample B) was heated without adding any alcohol at the same temperature 150° C. (302° F.) for the same period of time (5 minutes). The viscosities of Sample A and Sample B treated barley flours were then measured with the following results:

Brabender Results (6% pH 6.5 buffer with 1% NaCl)

| Sample | Peak Viscosity | Initial Viscosity at 95° C. | Viscosity After 30 Min. at 95° C. | Viscosity After 10 Min. at 50° C. |
|---|---|---|---|---|
| A (alcohol slurry, heat treated) | 120 | 80 | 120 | 265 |
| B (dry heat treated) | 150 | 100 | 130 | 270 |

The above viscosity comparisons for Samples A and B show that a dry, physical heat treatment of short duration will also modify the viscosity behavior of a barley flour. The thin-thick viscosity changes upon heating are not as pronounced with Sample B and with Sample A but there is a definite and measurable shift of the dry, heat-treated barley flour from its pretreatment viscosity behavior to that of an initially thin, but subsequently thicker product.

EXAMPLE VI

The above treated oat and barley flours of Example I, IV and V(A) were still retorted in 4.0 and 6.5 pH buffer using 5% dry solids basis of each starchy flour sample in water. The samples were retorted at 260° F. to $F_o$ (sterilization index) of 12. The respective starchy pastes were steam cooked for 10 minutes after reaching 185° F. and then retorted. The test results were as follows:

| | 4.0 pH Buffer | | | | 6.5 pH Buffer | | | |
|---|---|---|---|---|---|---|---|---|
| | Brookfield Visc. (cps) | | | Time To | Brookfield Visc. (cps) | | | Time To |
| Sample | Hot | Before Retort | After Retort | $F_o$ 12 in min. | Hot | Before Retort | After Retort | $F_o$ 12 in min. |
| I | 20 | 350 | 1780 | 14.5 | 20 | 200 | 3800 | 15.0 |
| IV | 87.5 | 780 | 1800 | 22.5 | 67.5 | 1250 | 5800 | 21.5 |
| V(A) | 100 | 500 | 1160 | 18.5 | 85 | 1700 | 5900 | 23.0 |

With the exception of Sample IV in 4.0 pH buffer, all of the samples exhibited thin-thick viscosity behavior during the test. Sample IV, which was the treated barley flour of Example IV, did show good thin-thick viscosity behavior in the pH 6.5 buffer test.

We claim:

1. A method of making a modified starch-containing flour having thin-thick viscosity characteristics so that when an aqueous slurry of said modified flour is heated under retorting conditions it will initially have a thin viscosity and subsequently thicken upon continued retorting thereof, said method comprising the steps of: (a) forming an aqueous alcohol slurry of said flour with an aqueous alcohol containing from about 80% to about 95% by weight alcohol and from about 5% to about 20% water, (b) heating said slurry to a temperature of at least 140° C. (284° F.) for a period of time sufficient to modify said flour in said slurry to a granular thin-thick flour; and (c) recovering the granular thin-thick flour from said slurry.

2. The method according to claim 1 wherein the starch-containing flour is slurried in aqueous alcohol in which the alcohol is a lower alcohol, the slurry is heated to a temperature in the range of 140°–171° C. for about 1–30 minutes, and the modified thin-thick flour is thereafter recovered from the slurry by filtering and desolventizing to provide a granular, desolventized thin-thick flour.

3. The method according to claim 2 wherein the slurry is heated to a temperature of at least 140° C. by continuously forcing the aqueous slurry through a confined zone at a temperature of at least about 160° C. (284° F.) so that the residence time of any portion of said slurry within the confined zone ranges from about 1–5 minutes.

4. The method according to claim 1 wherein the starch-containing flour is selected from the group consisting of oat flour, corn flour and barley flour and the alcohol is ethanol.

5. The method according to claim 3 in which the starch-containing flour is selected from the group consisting of oat flour, corn flour and barley flour and the alcohol is ethanol.

6. The method according to claim 2 wherein the starch-containing flour slurried with said aqueous alcohol is oat flour which has the following general analysis:

| Moisture | 3–15% by weight |
|---|---|
| Ash | 1–5% by weight |
| Protein/Fiber | 23–35% by weight |
| Protein | 12–24% by weight (as is basis) |
| Fat | 2–10% by weight (as is basis) |
| Starch | 55–70% by weight (dry solids basis) |
| Other Components | Balance |

7. The method according to claim 2 wherein the starch-containing flour slurried with said aqueous alcohol is corn flour which has the following general analysis:

| Moisture | 4–17% by weight |
|---|---|
| Ash | 1–3% by weight |
| Protein/Fiber | 7–24% by weight |
| Protein | 3–14% by weight (as is basis) |
| Fat | .01–9% by weight (as is basis) |
| Starch | 60–80% by weight (dry solids basis) |
| Other Components | Balance |

8. The method according to claim 2 wherein the starch-containing flour slurried with said aqueous alcohol is barley flour which has the following general analysis:

| Moisture | 2–17% by weight |
|---|---|
| Ash | 1–4% by weight |
| Protein/Fiber | 10–30% by weight |
| Protein | 3–22% by weight (as is basis) |
| Fat | .01–7% by weight (as is basis) |
| Starch | 55–70% by weight (dry solids basis) |
| Other Components | Balance |

9. A method for continuously preparing a thin-thick oat flour from oat flour, said method comprising the steps of:
(a) making an aqueous alcohol slurry of oat flour, with an aqueous alcohol containing from about 80% to about 95% by weight alcohol and from about 5% to about 20% water,
(b) continuously feeding said slurry through a continuous tubular reactor under pressure at an elevated temperature in the range of 140°–170° C. and at a feeding rate such that all portions of said slurry are held at the elevated temperature for 1–60 minutes and thereby convert the oat flour to a thin-thick oat flour; and
(c) recovering said thin-thick oat flour from said slurry.

10. A physically modified starch-containing flour with said flour being further characterized as containing starch granules in the non-gelatinized form and possessing thin-thick viscosity characteristics so that when an aqueous slurry of said physically modified flour is heated under retort conditions said retorted slurry will initially have a thin paste viscosity and will subsequently thicken into a viscous paste upon continued retorting thereof.

11. The physically modified starch-containing flour of claim 10 in which the flour is derived from an oat flour having the following general analysis:

| Moisture | 3–15% by weight |
|---|---|
| Ash | 1–4% by weight |
| Protein/Fiber | 23–35% by weight |
| Protein | 12–24% by weight (as is basis) |
| Fat | 2–10% by weight (as is basis) |
| Starch | 55–70% by weight (dry solids basis) |
| Other Components | Balance | with said modified oat flour being further characterized as having the following Brabender viscosities:
Brabender (6% by weight treated oat flour in pH 6.5 buffer with salt)

| Initial Viscosity at 95° C. | Viscosity after 30 min. at 95° C. | Viscosity after 10 min. at 50° C. |
|---|---|---|
| 120–200 | 185–210 | 340–360 |

12. The product of claim 10 in which the flour is derived from a corn flour having the following general analysis:

| Moisture | 4–17% by weight |
|---|---|
| Ash | 1–3% by weight |
| Protein/Fiber | 7–24% by weight |
| Protein | 3–14% by weight (as is basis) |
| Fat | .01–9% by weight (as is basis) |
| Starch | 60–80% by weight (dry solids basis) |
| Other Components | Balance | with said modified corn flour being further characterized as having the following Brabender viscosities:
Brabender (6% by weight treated corn flour in pH 6.5 buffer with salt)

| Initial Viscosity at 95° C. | Viscosity after 30 min. at 95° C. | Viscosity after 10 min. at 50° C. |
|---|---|---|
| 45–165 | 80–160 | 120–210 |

13. The product of claim 10 in which the flour is derived from a barley flour having the following general analysis:

| Moisture | 2–17% by weight |
|---|---|
| Ash | 1–4% by weight |

| -continued | |
|---|---|
| Protein/Fiber | 10-30% by weight |
| Protein | 3-22% by weight (as is basis) |
| Fat | .01-7% by weight (as is basis) |
| Starch | 55-70% by weight (dry solids basis) |
| Other Components | Balance | with said modified barley flour being further characterized as having the following Brabender viscosities:

Brabender (6% treated barley flour, pH 6.5 buffer with 1% NaCl)

| Initial Viscosity at 95° C. | Viscosity after 30 min. at 95° C. | Viscosity after 10 min. at 50° C. |
|---|---|---|
| 120–150 | 120–130 | 265–270 |

* * * * *